Patented Feb. 13, 1923.

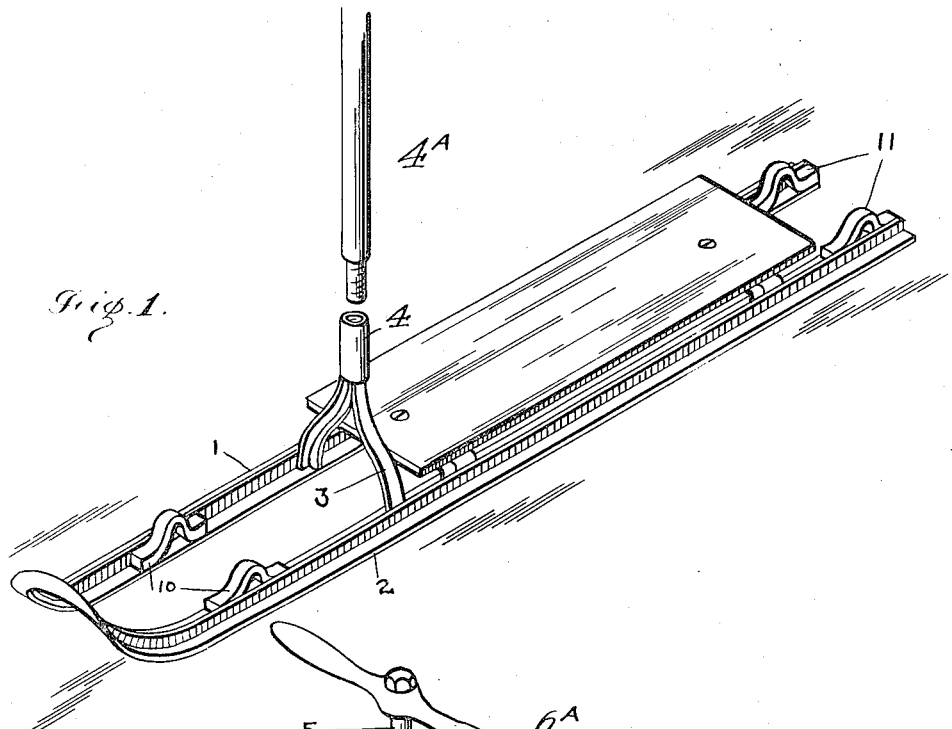
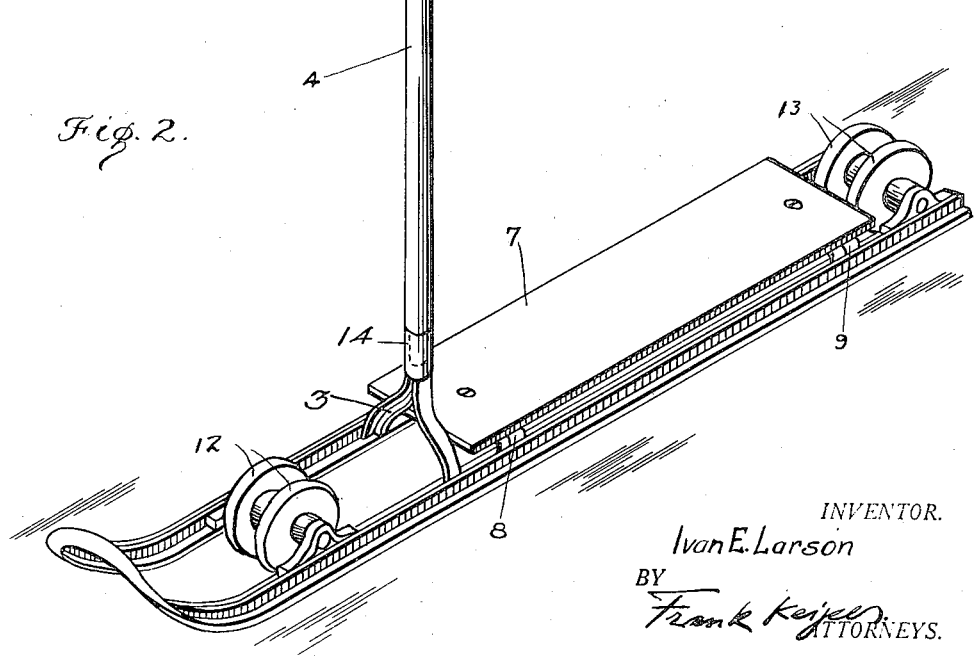

1,445,219

UNITED STATES PATENT OFFICE.

IVAN E. LARSON, OF ROCHESTER, NEW YORK, ASSIGNOR OF ONE-HALF TO TIMOTHY J. O'BRIEN, OF ROCHESTER, NEW YORK.

COMBINATION SCOOTER.

Application filed January 30, 1922. Serial No. 532,823.

*To all whom it may concern:*

Be it known that I, IVAN E. LARSON, a citizen of the United States, residing at Rochester, in the county of Monroe and State of New York, have invented certain new and useful Improvements in Combination Scooters, of which the following is a specification.

The object of this invention is to construct a scooter that can be propelled by sliding it on snow or ice in the winter or by running it on wheels at any other time.

These and other objects of the invention will be fully illustrated in the drawing, described in the specification and pointed out in the claims at the end thereof.

In the accompanying drawing:

Figure 1 is a perspective view of the scooter for use in sliding on ice or snow.

Figure 2 is a perspective view of the scooter equipped for running on the ground without snow or ice.

In the several figures of the drawing like reference numerals indicate like parts.

Scooters of different designs have heretofore been used by children to ride over smooth roads, sidewalks, etc., and it is the object of this invention to extend the use of this type of vehicle for winter by constructing the frame and other parts of the scooter so that it can be used to slide on snow or ice. For this purpose the frame is constructed of a pair of parallel runners 1 and 2, which are bent up of a single length of T iron. The front end of the frame where the two runners are joined together is curved upwardly, as illustrated, to guide the runners up over obstacles, thus avoiding the possibility of the scooter being stopped by contact with them.

At a suitable point near the front end of the frame is provided the steering post or handle support 3 which is formed by an arch made up of a pair of short T irons bent and joined together at the top and welded to the runners at the lower ends thereof. The support 3 carries a ferrule 4 at the top thereof, into which the steering column 4ª is fastened. The steering column 4ª is preferably hollow at the upper end to receive an extension 5 which can be adjustably held in place therein by means of the set screw 6 in the end of the hollow portion of the column 4. This is for the purpose of adapting the height of the steering column to the child who is to operate the scooter. At the top of the extension 5 is provided the horizontal handle 6ª.

Between the runners 1 and 2 and directly behind the support 3 of the steering column is mounted the base board 7. For this purpose a pair of brackets 8 and 9 are welded to the runners 1 and 2 which bridge the space between them and support the board 7 at the proper height from the ground.

To operate the scooter on ice or snow the child takes hold of the handle 6ª and places one foot on the baseboard 7 directly behind the support for the steering column to support himself thereon and braces himself against the steering column. With the other foot he pushes himself forward against the support of the steering column and in so doing propels the scooter forwardly. A few strokes with the foot will cause the scooter to glide rapidly over the snow or ice so that the child can place both feet on the base board and coast on the scooter until the momentum atained thereby has spent itself and the scooter slows down or stops. The operation may then be repeated until sufficient speed is again attained with the scooter to permit coasting.

On a downward grade it is of course not necessary to start the scooter by pushing it ahead, as above pointed out. The scooter will start to slide downgrade without propelling power unless the initial speed is to be increased, in which case the scooter can be pushed for a short distance until the desired momentum is attained, and then allowed to coast for the remainder of the grade.

For the purpose of using the scooter with wheels the runners are provided with two pairs of bearing brackets 10, 10 and 11, 11. Each of these brackets is made up of a metal strap which is curved up in the middle and has the ends thereof welded to the runners 1 and 2 respectively. The closed loops formed in this way form the bearings into which a suitable shaft is inserted and on which the rollers or wheels 12 and 13 are mounted to rotate to support the scooter frame and make it roll instead of glide.

I claim:

1. In a scooter the combination of a pair of runners joined and curved upwardly at the front end thereof, a stationary arch mounted between said runners and supported thereby intermediate of the ends of said runners, a ferrule mounted on said arch, a post supported in said ferrule, a platform mounted on top of said runners behind said arch.

2. In a scooter the combination of a pair of runners joined and curved upwardly at the front end thereof, a stationary arch mounted between said runners and supported thereby intermediate of the ends of said runners, a ferrule mounted on said arch, a post supported in said ferrule, a platform mounted on top of said runners behind said arch, a pair of bearings mounted on each of said runners, one of each pair of said bearing straps being located in front of said arch, axles mounted between said bearing straps and wheels mounted to rotate on said axles between said runners.

In testimony whereof I affix my signature.

IVAN E. LARSON.